3,323,857
SELECTIVE EXTRACTION AND SEPARATION OF LANTHANIDES WITH A QUATERNARY AMMONIUM COMPOUND
Donald J. Bauer and Roald E. Lindstrom, Reno, Nev., assignors to the United States of America as represented by the Secretary of the Interior
No Drawing. Filed Dec. 16, 1965, Ser. No. 514,406
10 Claims. (Cl. 23—23)

The invention herein described and claimed may be manufactured and used by or for the Government of the United States of America for governmental purposes without the payment of royalties thereon or therefor.

This invention relates to the separation of the elements in lanthanide mixtures from one another.

The term "lanthanide" as used in the present specification includes the lanthanide rare earth elements having atomic numbers from 57 to 71 inclusive, and the element yttrium, atomic number 39, which is ordinarily found in lanthanide rare earth concentrates and acts similarly to these elements in chemical separations.

Lanthanides are usually obtained mixed together from ore concentrates and are difficult to separate due to their great chemical similarity. Classical techniques such as fractional crystallization have been used as separation expedients but are very time consuming and yields are usually low. Ion exchange is a superior technique but throughputs are low. Several solvent extraction techniques have been developed using organophosphates, amines, and carboxylic acids but in most cases the ability of these solvents to separate one element from another (separation factor) is relatively low.

The object of this invention is to provide a new solvent extraction technique for efficiently and quickly separating lanthanides from one another.

It has now been discovered that certain quaternary ammonium compounds can achieve desirable lanthanide separation results.

Further objects and advantages will be had from the following description of the process.

Utilizing conventional liquid-liquid extraction expedients, an aqueous lanthanide feed prepared, for example, by dissolving lanthanide oxides in a nitric acid solution is contacted with a water immiscible organic solvent containing a quaternary ammonium compound capable of forming with each lanthanide a complex that is preferentially soluble in the resultant organic phase, a variation in chemical stability existing between complexes. Quaternary ammonium salts capable of performing these functions have the following basic cation:

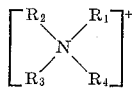

wherein $R_1$, $R_2$, $R_3$ and $R_4$ are hydrocarbons. Finally, the ammonium compound should provide for ready phase disengagement after the extraction. Aliquat 336, a methyl tricaprylyl ammonium chloride, made by General Mills, is a very effective extractant and has the following cation:

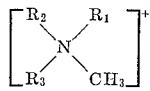

wherein $R_1$, $R_2$ and $R_3$ are hydrocarbon chains having 8 to 10 carbon atoms, with 8 carbon atoms prevailing. Rocal, an alkyl ($C_8$–$C_{13}$) benzyl-dimethyl ammonium chloride, made by Sterwin Chemicals, Inc., is also very suitable.

Lighter lanthanides form somewhat more stable complexes with the above compounds than the heavier lanthanides. Consequently a lighter lanthanide has a higher distribution coefficient than an adjacent heavier lanthanide. Distribution coefficient (D) is defined as the ratio of the concentration of an element in the organic extract phase to its concentration in the aqueous raffinate phase. Thus for component A, $D=[A]$ org./$[A]$ aq. The ratio of distribution coefficients between two components is known as the separation factor (S.F.). Thus for components A and B, $S.F.=D_A/D_B$.

Although hydrocarbon solvents in general are suitable, aromatic hydrocarbons such as xylene and toluene are more satisfactory as organic solvents for purposes of the invention. Socal 355L, a product of the Standard Oil Company of California is very effective. It contains 55 percent aromatics, 18 percent paraffines and 27 percent naphthenes.

Once the organic phase has extracted the lanthanides, these values can be recovered therefrom by standard techniques such as stripping the organic phase with ammonium chloride solution, and precipitating these values from the resultant strip and raffinate solutions with oxalic acid.

As the nitrate ion concentration of the feed solution increases, the extraction percentages increase. High ion concentrations can originate from the lanthanide nitrates themselves, or may be obtained by the addition of nitrate salts such as ammonium nitrate.

Chelating agents for the lanthanides improve separation factors. Diethylenetriaminepentaacetic acid (DTPA), for example, is desirable for forming lanthanide chelates with the light group elements in aqueous solutions while ethylenediaminetetraacetic acid (EDTA) is preferred for chelation of yttrium and the heavy group elements. These agents function to increase separation factors by selectively preventing the relatively heavier lanthanides from reacting with the extractant. Most amino carboxylic acid chelating agents may be employed, the particular agent utilized depending on the lanthanide composition. When using such agents, it is necessary to control the pH so that it is high enough for lanthanide chelate formation, but not so high as to cause precipitation by hydrolysis. The useful pH range varies with the particular system. Generally, usable ranges vary from pH 2 to pH 7.

Quaternary ammonium compound concentrations in the organic solvent and the volume ratio between the organic extractant and aqueous feed are not critical. However, increased lanthanide concentrations in the aqueous feed obviously require proportionately greater amounts of extractant compound, and the compound concentration should be maintained at a value which will permit rapid phase disengagement between the aqueous and organic phases after intimate mixing. A compound concentration range of 10–30 volume percent is advantageous for such disengagement purposes.

The following examples illustrate the effect of these above factors on single stage extraction. Although elevated temperatures appear to enhance the operation, extractions were carried out under ambient conditions (pressure has mineral effect since liquids are involved).

EXAMPLE 1

To determine the effect of ammonium nitrate concentration on the separation of praseodymium (Pr) from neodymium (Nd), an aqueous feed containing 15 grams each of Pr and Nd per liter was prepared by dissolving the nitrates of these elements in water; the lanthanides were then chelated 35% with DTPA; a pH of 3.3 was established. Varying amounts of ammonium nitrate were then added to a plurality of feed samples and each sample was then intimately mixed with an organic extractant (organic extractant-aqueous feed volume ratio of 2:1) comprised of 23 volume percent methyl tricaprylyl ammonium chloride in Socal 355L diluent and the following results were obtained:

| Ammonium nitrate concentration g./l | Percent Pr and Nd extracted | Pr to Nd separation factor |
|---|---|---|
| 130 | 38 | 1.2 |
| 260 | 52 | 1.3 |
| 400 | 60 | 2.5 |
| 520 | 62 | 3.0 |
| 735 | 66 | 2.6 |

EXAMPLE 2

To determine the effect of DTPA chelation on the separation of lanthanum (La) from cerium (Ce), an aqueous feed containing 14 grams each of La and Ce per liter was prepared by dissolving the nitrates of these elements in water; 800 grams of ammonium nitrate were added per liter; a pH of 3.2 was established. Varying amounts of DTPA were added to a plurality of feed samples and each sample was then intimately mixed with an organic extractant (organic-aqueous volume ratio of 2:1) comprised of 23 percent methyl tricaprylyl ammonium chloride in Socal 355L diluent and the following results were obtained:

| Lanthanides chelated with DTPA, percent | Percent La and Ce extracted | La to Ce separation factor |
|---|---|---|
| 12 | 75 | 3.3 |
| 25 | 62 | 5.4 |
| 37 | 46 | 8.0 |
| 50 | 30 | 7.0 |

EXAMPLE 3

To determine the effect of quaternary ammonium concentration in the organic phase on the separation of La from Ce, an aqueous feed the same as that employed in Example 2 was prepared except that the feed was chelated 25 percent with DTPA and a pH of 3.3 was established. Organic extractant was added to a plurality of aqueous feed samples in an organic-aqueous volume ratio of 2:1, but varying concentrations of methyl tricaprylyl ammonium chloride in Socal 355L diluent were distilled with each sample and the following results obtained:

| Volume percent of ammonium compound in diluent | Percent La and Ce extracted |
|---|---|
| 3 | 10 |
| 6.5 | 30 |
| 10 | 40 |
| 13 | 50 |
| 23 | 70 |
| 33 | 70 |

EXAMPLE 4

To further determine the effect of chelation, an aqueous feed containing La (18 grams per liter), Pr. (2.1 grams per liter), Nd (6.7 grams per liter), Sm (0.3 gram per liter), and Gd (0.8 gram per liter) was prepared by dissolving the nitrates of these elements in water; 320 grams of ammonium nitrate were added per liter; a pH of 3 was established. Varying amounts of DTPA were added to a plurality of feed samples and each sample was then intimately mixed with an organic extractant (organic-aqueous volume ratio of 1:1) comprised of 19 volume percent methyl tricaprylyl ammonium chloride in Socal 355L diluent and the following results obtained:

[Sm and Gd were not extracted]

| Percent lanthanides chelated with DTPA | Percent of total lanthanide extracted | Separation factors ||
|---|---|---|---|
| | | (La to Pr) | (Pr to Nd) |
| 60 | 16 | 10 | 2.3 |
| 40 | 23 | 12 | 3.7 |
| 35 | 25 | 8.8 | 2.6 |
| 20 | 29 | 4.6 | 2.4 |

EXAMPLE 5

To further determine the effect of chelation, an aqueous feed containing La (40 grams per liter), Pr (3.3 grams per liter), Nd (12 grams per liter), and Sm (1.4 grams per liter) was prepared by dissolving the nitrates of these elements in water; 375 grams of ammonium nitrate were added per liter; a pH of 3.5 was established. Varying amounts of DTPA were added to a plurality of feed samples and each sample was then intimately mixed with an organic extractant (organic-aqueous volume ratio 4:1) composed of 50 volume percent methyl tricaprylyl ammonium chloride in Socal 355L diluent and the following results obtained:

| Percent lanthanides chelated with DTPA | Percent extraction | Separation factors | | |
|---|---|---|---|---|
| | | (La to Pr) | (Pr to Nd) | (Nd to Sm) |
| 0 | 89 | 2.9 | 2.0 | 2.0 |
| 27 | 70 | 32 | 4.0 | 1.2 |
| 54 | 46 | 50 | 1.0 | .6 |
| 80 | 21 | 12 | 1.1 | .8 |

As shown above, nitrate ion concentration, the quantity of quaternary ammonium compound present and the percent of chelation all affect extraction percentages and separation factors. Therefore, by adjusting the nitrate ion concentration and the amount of ammonium compound present, high extraction percentages can be achieved, while the percent chelation can be adjusted to secure maximum separation factors.

The processes employed in the above examples involved only single stage operations. As is well known in the liquid-liquid extraction art, greater separations can be achieved with multi-stage extraction processes. If, for example, a lanthanum-cerium mixture were contacted with thanum could be extracted relatively free of the cerium. In view of this expedient and in view of the fact that chelation has a significant effect upon separation, if an aqueous lanthanide mixture were extracted a plurality of times by extracting the initial raffinate and subsequent raffinates, the chelation percentage being varied for each extraction and each involving a multi-stage process, each lanthanide could be removed from the aqueous feed relatively free of the other lanthanides.

A rapid separation technique is combined with an efficient extractant medium in the liquid-liquid extraction process of the present invention.

Although the particular process is well adapted to carry out the objects of the present invention, it is to be understood that various modifications and changes may be made all coming within the scope of the following claims.

What is claimed is:

1. A process for separating from one another a mixture of lanthanides in aqueous solution comprising intimately contacting said aqueous solution with an organic extractant containing a relatively water immiscible hydrocarbon solvent and a quaternary ammonium compound having the cation

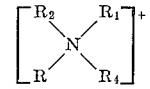

wherein $R_1$, $R_2$, $R_3$ and $R_4$ are hydrocarbons, wherein said quaternary ammonium compound is capable of forming with each of said lanthanides a complex that is preferentially soluble in said organic solvent, the degree of complex stability varying between complexes, whereby said contacting step results in the formation of an aqueous raffinate phase and an organic extract phase, and whereby said contacting step results in a different percentage of each lanthanide being transferred to said organic extract phase, subsequently separating said phases from one another, and removing lanthanide values from said organic phase.

2. The process of claim 1 wherein said aqueous solution contains a high nitrate ion concentration.

3. The process of claim 2 wherein said high nitrate ion concentration is obtained by adding a nitrate salt to said aqueous solution prior to extraction.

4. The process of claim 1 wherein an amino carboxylic acid chelating agent is added to said aqueous solution prior to extraction.

5. The process of claim 4 wherein said chelating agent is selected from the group consisting of diethylenetriaminepentaacetic acid and ethylenediaminetetraacetic acid.

6. The process of claim 1 wherein said quaternary ammonium compound is methyl tricaprylyl ammonium chloride.

7. The process of claim 5 wherein said hydrocarbon solvent contains aromatics.

8. The process of claim 2 wherein an amino carboxylic acid chelating agent is added to said aqueous solution prior to extraction.

9. The process of claim 8 wherein said chelating agent is selected from the group consisting of diethylenetriaminepentaacetic acid and ethylenediaminetetraacetic acid.

10. The process of claim 8 wherein said aqueous solution is extracted a plurality of times by contacting said aqueous raffinate phase and subsequent raffinates with said organic extractant, the percent chelation in each contacting step being varied whereby a different lanthanide is predominantly extracted in each contacting step.

References Cited

UNITED STATES PATENTS 3,083,085   3/1963   Lewis et al. _____ 23—340 X
3,223,476   12/1965  Hart _____ 23—340

OTHER REFERENCES

Moeller et al., J. Am. Chem. Soc., vol. 77, 1955, pp. 3182–3184. QD1 A5.

CARL D. QUARFORTH, *Primary Examiner.*

L. A. SEBASTIAN, *Assistant Examiner.*